United States Patent [19]

Kim

[11] 4,159,360
[45] Jun. 26, 1979

[54] STABILIZED FABRICS

[75] Inventor: Charles W. Kim, Wilmington, Del.

[73] Assignee: Hercules Incorporated, Wilmington, Del.

[21] Appl. No.: 826,489

[22] Filed: Aug. 17, 1977

Related U.S. Application Data

[63] Continuation-in-part of Ser. No. 732,832, Oct. 15, 1976, abandoned.

[51] Int. Cl.² ............................................. B32B 3/00
[52] U.S. Cl. ...................................... 428/195; 428/85; 428/196; 428/197; 428/198; 428/233; 428/234; 428/235; 428/247; 428/253
[58] Field of Search ................ 428/85, 90, 109, 110, 428/111, 137, 138, 234, 235, 236, 247, 253, 255, 195, 196, 197, 198; 156/148, 179

[56] References Cited

U.S. PATENT DOCUMENTS

| | | | |
|---|---|---|---|
| 3,307,990 | 3/1967 | Homier et al. | 428/235 |
| 3,400,188 | 9/1968 | Olson | 156/148 |
| 3,464,876 | 9/1969 | Barb | 156/155 |
| 3,682,738 | 8/1972 | Smith | 428/196 |
| 3,697,347 | 10/1972 | Lehmann | 428/255 |
| 3,713,931 | 1/1973 | Svendsen | 156/148 |
| 3,769,119 | 10/1973 | Mizell et al. | 156/83 |
| 3,935,046 | 1/1976 | Kiernan et al. | 428/300 |
| 4,053,668 | 10/1977 | Himmsel et al. | 428/234 |
| 4,122,227 | 10/1978 | Dean | 428/198 |

FOREIGN PATENT DOCUMENTS 1170052  11/1969  United Kingdom .................... 428/234

*Primary Examiner*—James J. Bell
*Attorney, Agent, or Firm*—James W. Peterson

[57] ABSTRACT

Stabilized fabrics include a woven, knitted or tufted fabric layer bonded to a stabilizing layer of staple or continuous filament fibers by an air-permeable bonding layer of thermoplastic material. The bonding is carried out under heat and pressure sufficient to melt the bonding layer and have it penetrate into the fibers of both the fabric layer and the stabilizing layer.

11 Claims, 22 Drawing Figures

FIG. 1
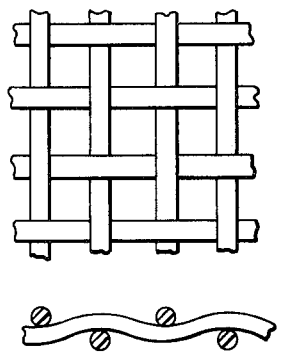
FIG. 2
FIG. 3
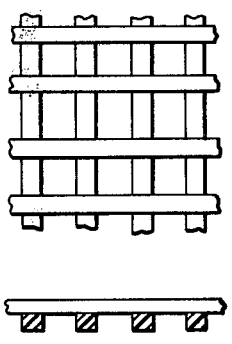
FIG. 4
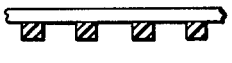
FIG. 5
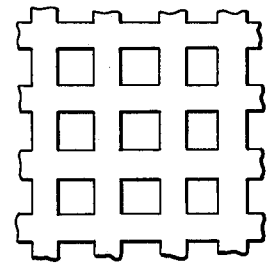
FIG. 6
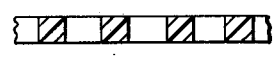
FIG. 7
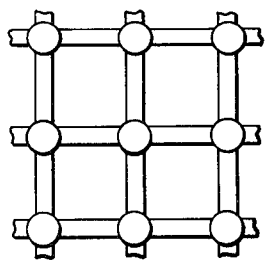
FIG. 8
FIG. 9
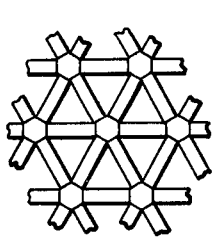
FIG. 10
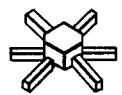
FIG. 11
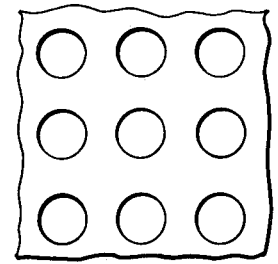
FIG. 12
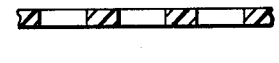
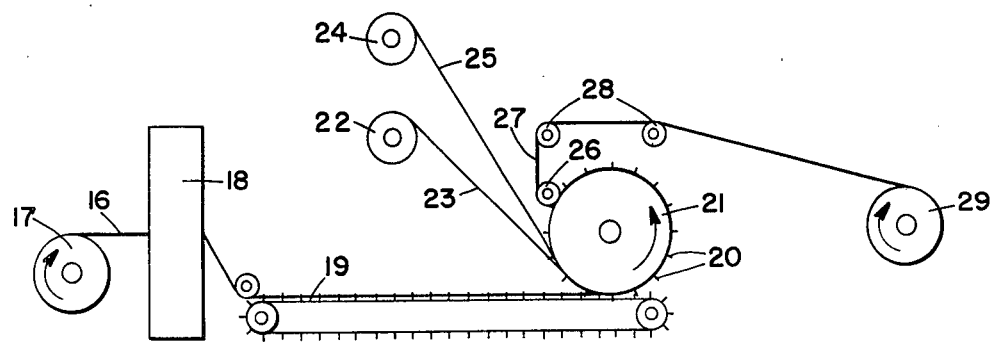
FIG. 13

STABILIZED FABRICS

This is a continuation-in-part of application Ser. No. 732,832, filed Oct. 15, 1976 now abandoned.

This invention relates to stabilized fabrics and particularly to fabrics having certain stabilizing structures bonded thereto to provide improved characteristics including dimensional stability, breathability and improved seam strength.

It is old in the art to stabilize certain fabrics by applying to the fabric a latex backing. While latex backing does stabilize such fabrics, it results in a product which lacks breathability, hot water washability, softness, and also is heavy and difficult to cut and sew. Such latex stabilized fabrics, when used in upholstering, often require slip liners because the rough surface of the latex backing catches on the padding.

Now in accordance with this invention, it has unexpectedly been found that woven, knitted and tufted fabrics can be stabilized by bonding the fabric with either (1) a stabilizing web of staple or continuous filament fiber and a thermoplastic netting, (2) a thermoplastic netting or film needle-punched with a loose stabilizing web of staple or continuous filament fibers, or (3) a thermoplastic netting which has been needle-punched to the fabric itself prior to bonding. The stabilized fabric thus produced has improved dimensional stability, soft hand, high strength and seam slippage characteristics, high breathability, good drape and conformity, resistance to washing, improved durability, and further is relatively easy to cut and sew. The stabilized fabrics can be made by aligning the fabric so that the pattern or printed design is not distorted; advancing the fabric under tension to a bonding station; heating the thermoplastic netting or needle-punched film to its melt temperature; bonding the fabric, the melted netting or film, and the stabilizing web of staple or continuous filament fibers (or the fibers needle-punched into the netting or film) together under pressure sufficient to insure substantially complete penetration of the molten thermoplastic into the fibers of the stabilizing web or the needle-punched fibers and partial penetration into the fabric, and cooling the resulting composite structure to effect hardening of the thermoplastic.

Any woven, knitted or tufted fabric can be stabilized in accordance with this invention. Typical fabrics that can be employed are fabrics of cotton, linen, wool, silk, jute, or polypropylene, polyester, polyamide, rayon and acrylic. The invention is particularly advantageous for stabilizing loosely woven fabrics. By the term "loosely woven fabric" is meant a fabric having a seam slippage value of below 15 pounds in both the machine and transverse directions, as determined by the ASTM D434-75 procedure. These fabrics can be stabilized to have a seam slippage value of at least 25 pounds in both directions.

Any thermoplastic netting or film material can be used in the practice of this invention. It is important, however, that the stabilized fabric have breathability or air permeability. Thus, the thermoplastic bonding layer must have perforations or openings therethrough. A thermoplastic netting satisfies this requirement. However, a thermoplastic film can only be utilized if it is perforated, or if it is needle-punched or either a web of staple or continuous filament fiber, to the fabric itself, or to both, the needle-punching providing the necessary air permeability. Typical thermoplastics from which said netting and film materials can be made are polyethylene, polyvinyl chloride, amorphous polyamides, thermoplastic polyurethanes, ethylene—vinyl acetate copolymers, ethylene—acrylic acid copolymers, polyvinylidene chloride and its copolymers and acrylic polymers and copolymers. Depending on the fabric to be stabilized, certain thermoplastic materials will be more desirable than others. For example, for stabilizing polypropylene fabrics, it is desirable that the thermoplastic netting or film material have a softening point below about 130° C. For other fabrics, such as cotton, wool, silk, linen, polyester, polyamide, rayon or acrylic, thermoplastic netting or film materials having softening points up to about 200° C. could be utilized, however, it is preferable to use thermoplastic netting or film materials having lower softening points. In general, it is desirable that the netting be at least 0.3 oz./sq. yd. and the films be at least 1 mil in thickness to obtain the desired bonding.

Typical configurations of netting which can be used in the practice of this invention are shown by way of example in FIGS. 1 through 12.

FIG. 1 shows in plan, a portion of an open network of thermoplastic material in sheet form, to an enlarged scale, comprising interwoven, spaced, parallel strands of circular section.

FIG. 2 shows in elevation the interwoven network of FIG. 1.

FIG. 3 shows in plan, and FIG. 4 in elevation another open network of thermoplastic material in sheet form, to an enlarged scale, comprising spaced parallel strands of rectangular sections overlaying and made integral with similar strands at right angles thereto.

FIG. 5 shows in plan and FIG. 6 shows in side elevation, another open network of thermoplastic material in sheet form, to an enlarged scale, comprising strands of rectangular section forming a network of squares with all the strands laying in one plane.

FIG. 7 is a plan of a portion of an open network of a thermoplastic material in sheet form, to an enlarged scale, comprising circular solid bosses connected by strands.

FIG. 8 is a sectional view of such bosses and aligned strands.

FIG. 9 shows in plan, and FIG. 10 in fragmentary perspective view, another open network of thermoplastic material of a type similar to that shown in FIGS. 7 and 8.

FIG. 11 shows in plan, and FIG. 12 shows in side elevation, another open network of thermoplastic material in sheet form, to an enlarged scale, comprising a sheet or film having uniform size and uniformly spaced circular openings.

FIG. 13 is a schematic view illustrating the process and apparatus for making stabilized fabrics in accordance with the principles of this invention.

Figure 14:
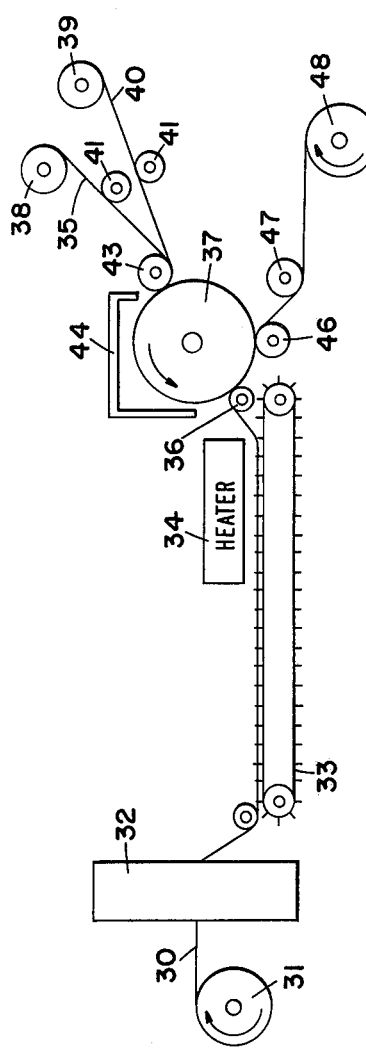
FIG. 14 is a schematic view illustrating an alternative process and apparatus for making stabilized fabrics in accordance with the principles of this invention.

It will be readily apparent to those skilled in the art that innumerable other configurations of netting can be employed in the practice of this invention. The thermoplastic nets employed in the practice of this invention can be formed in many ways, including molding, the laying of spaced strands or threads of desired cross-sections onto other similarly spaced strands or threads arranged at a right angle to the first-mentioned spaced strands or threads and integrating the strands or threads at the crossing areas, punching holes or openings in sheets or films of thermoplastic material, or the weaving together of such strands or threads to form an open network. A preferred method of forming the nets is described in British Pat. No. 914,489, published Jan. 2, 1963.

In general, these thermoplastic nets will have up to about 2,000 openings per square inch, preferably from about 160 openings per square inch to about 1,500 openings per square inch.

Where the netting or film is needled with staple fibers, the staple fibers are preferably from about 1 to about 20 denier and have a length of from about ½ to about 6 inches. Best results are obtained when from about 0.3 oz./sq. yd. to about 2 oz./sq. yd. of staple fibers are randomly laid on the netting or film and needle-punched to an amount greater than 25 penetrations per square inch. If desired, continuous filament fibers instead of staple fibers could be needled to a netting or film to obtain the desired composite structure. Typical staple fibers which can be used in the practice of this invention are those of rayon, polyester, polyamides, polyvinyl chloride, cotton, wool, silk, polypropylene and those acrylics with a shrinkage temperature above the softening point of thermoplastic netting. Typical continuous fibers which can be utilized are nylon, polyester, and polypropylene.

Where the thermoplastic netting or film is not needle-punched with staple or continuous filament fibers, but rather is used in combination with a separate web of staple or continuous filament fibers, such as a spun-bonded nonwoven, the web will preferably weigh from about 0.4 oz./sq. yd. to about 2 oz./sq. yd. Typical fibers used in preparing such webs are those described above.

The stabilized fabrics of this invention can be made by aligning the fabric; advancing the fabric under tension to a bonding station; heating the thermoplastic netting or needle-punched film to its melt temperature; bonding the fabric, the melted netting or film, and the stabilizing web of staple or continuous filament fibers or the fibers needle-punched into the netting or film together under pressure sufficient to insure substantially complete penetration of the molten thermoplastic into the fibers of the stabilizing web or the needle-punched fibers and partial penetration into the fabric; and cooling the resultant composite structure to effect hardening of the thermoplastic. Where the process is continuous, the fabric can be aligned by passing it through a conventional fabric straightener, which may either be automatic, manual, or both. Fabric straighteners are well known in the art and need not be described here. The fabric can be advanced under tension with the use of a tenter, such as a pin or clamp tenter, which transversely stretches the fabric and places it under tension before it is heated. The fabric is heated so that the melted thermoplastic netting or film will not solidify upon initial contact with the fabric. In general, the fabric can be heated by passing it beneath a heater or by passing the fabric and the netting or needle-punched film or netting over a heated roll. It may be desirable to use a fluoropolymer coated heating roll or a release film to prevent the thermoplastic from sticking to the roll. If the fabric is to be maintained under tension while heating, the heated roll can be fitted with pins on its periphery which catch the fabric as it leaves the tenter and maintain it under tension. Alternatively, belts on the periphery of the heated roll can serve the same purpose as the pins. Still another method is by using a blanket to hold the fabric in tension against the roll. Still other means will be obvious to those skilled in the art. The fabric, the melted netting or film, and the stabilizing web of staple or continuous filament fibers or the stabilizing fibers needle-punched into the netting or film are bonded together under pressure sufficient to insure substantially complete penetration of the molten thermoplastic into the fibers of the stabilizing web or into the stabilizing needle-punched fibers and partial penetration into the fabric by several methods. One of the easiest means for exerting pressure on the fabric, netting or film and stabilizing web is with a nip roll, whereby the composite fabric structure passes between the nip of the heated roll and an adjacent roll. If desired, the adjacent nip roll can be cooled by some known means, such as water cooling. It will be obvious to those skilled in the art that the cooling step can be conducted separately from the bonding step, such as by using an air knife directed on the fabric.

In general, the heating of the thermoplastic netting will be carried out at temperature in the range of from about 80° C. to 240° C., preferably about 100° C. to 220° C., most preferably about 120° C. to 200° C. The required time of heating will vary inversely with the temperature and will be in the range of from about 1 second to 60 seconds, preferably 2 to 30 seconds, and most preferably 3 to 15 seconds. The pressure required to insure substantially complete penetration of the molten plastic into the fabrics of the stabilizing web and partial penetration into the fabric will be in a range of from about 1 to 100 lbs. per linear inch, preferably 10 to 90 lbs. per linear inch, most preferably 40 to 80 lbs. per linear inch.

The equipment or apparatus used in carrying out the process of this invention includes means for aligning the fabric, such as a fabric straightener, means for placing the fabric under tension, such as a tenter, means for bonding the fabric with the thermoplastic netting or film and stabilizing web or fibers, such as a heated roll, means for applying pressure to the composite structure to cause substantially complete penetration of the molten plastic into the stabilizing web or fibers and partial penetration into the fabric, and means for cooling the composite structure, such as a cooled nip roll.

A typical apparatus for stabilizing fabric in accordance with this invention is shown in FIG. 13. As illustrated in FIG. 13, the fabric 16 is drawn from a fabric supply roll through a fabric straightener 18 to align the fabric and onto a pin tenter 19 which places the fabric under tension. As the fabric 16 advances, it is engaged by the pins 20 on a heated drum 21 which maintains tension on the fabric 16. The netting supply roll 22 supplies the netting or film 23 (which has been needle-punched with staple or continuous filament fibers) between the fabric 16 and the heated roll 21. In those cases where a separate stabilizing web of staple or continuous filament fibers is used, a web supply roll 24 advances the stabilizing web 25 onto the netting 23 (which does not have staple or continuous filament fiber needled thereto) and then around the heated roll 21. After passing at least 180° around the heated roll 21, or a sufficient distance to melt the netting or film, the fabric 16, melted netting or film 23 and stabilizing web of staple or continuous fibers 25 pass beneath the nip of chilled roll 26 and heated roll 21, insuring penetration of the melted thermoplastic into the fabric structure as previously described. The structure then passes at least 120° around the chill roll 26 which hardens the thermoplastic. The thus stabilized fabric 27 passes over idler rolls 28 and is taken up on roll 29.

Referring to FIG. 14, there is shown alternative apparatus for manufacturing stabilized fabrics in accordance with this invention. Fabric 30 is drawn from a fabric supply roll 31 and passes through a fabric straightener 32 which straightens the bow and bias of the fabric so that it is properly aligned as it advances onto a pin tenter 33 which places the fabric under transverse tension. The pin tenter 33 is preferably a split pin tenter which allows one set of pins on one side of the fabric to be advanced at a different rate from the other set of pins on the other side of the fabric. Thus, if all of the bias is not removed from the fabric by the fabric straightener 32, an operator can control the speed of one set of pins relative to the other to remove any remaining bias in the fabric. The fabric 30 advances under tension beneath a heater 34, which heats the fabric 30 so that when it comes into contact with the melted thermoplastic netting or film, the thermoplastic will not solidify upon contact. The fabric 30 is lifted off the pins of the pin tenter 33 by a strip roll 36 which urges it against a heated drum 37. A supply roll 38 of thermoplastic netting 35 and a supply roll 39 of a stabilizing web 40 of staple or continuous filament fibers is provided. The netting 35 and stabilizing web 40 advance over a pair of bowed rolls 41 which keep the materials wrinkle-free. The netting 35 and stabilizing web 40 then pass between a heated nip roll 43 and the heated drum 37 to preheat the thermoplastic netting. As the thermoplastic netting 35 and the stabilizing web 40 advance about the periphery of the drum 37, which is enclosed within an insulating hood 44 to help retain the drum heat, the thermoplastic netting begins to melt. At the point where it reaches the strip roll 36 and comes into contact with the fabric 30, the thermoplastic netting is completely melted. The fabric 30, melted netting 35 and stabilizing web 40 continue around the heated drum 37 to a bonding station where pressure is applied to the materials by a roll 46 to bond the materials into a unitary composite structure. The temperature of drum 37 and the pressure at the bonding station between roll 46 and drum 37 must be sufficient to cause substantially complete penetration of the melted thermoplastic 35 into the fibers of the stabilizing web 40 and partial penetration of the melted thermoplastic into the fabric 30. The roll 46 is desirably rubber-covered to protect the surface texture of the fabric 30. The roll is also desirably water-cooled to cool the stabilized fabric and solidify the molten thermoplastic netting. The stabilized structure then advances around a second water-cooled roll 47 which further completes the cooling action, and then is wound on a take-up roll 48.

While the above-described embodiments work satisfactorily for certain fabrics, such as cotton, rayon and polyester, certain other heat-sensitive materials, most notably polypropylene, may encounter shrinkage due to the closeness of the temperature of the heated drum and the melting temperature of the fabric itself. With cotton, polyamide, polyester, or rayon, or any non-thermoplastic or cellulosic fiber, the temperature of the drum and the melting temperature of the thermoplastic netting, will not usually adversely affect the fabric and shrinkage is not a problem. However, with thermoplastic fabrics which have a low melting temperature, such as polypropylene which melts at approximately 160° C., shrinkage is a problem and care must be taken to avoid melting and shrinkage of the fabric. Accordingly, another embodiment which maintains the width of the fabric without subjecting it to prolonged high temperature is particularly suitable for such heat-sensitive fabrics as polypropylene. The following embodiment may also be desirable for any fabrics including those that have a substantial portion of thermoplastic fiber contained therein as well as those that have no thermoplastic fiber therein.

Figure 15:
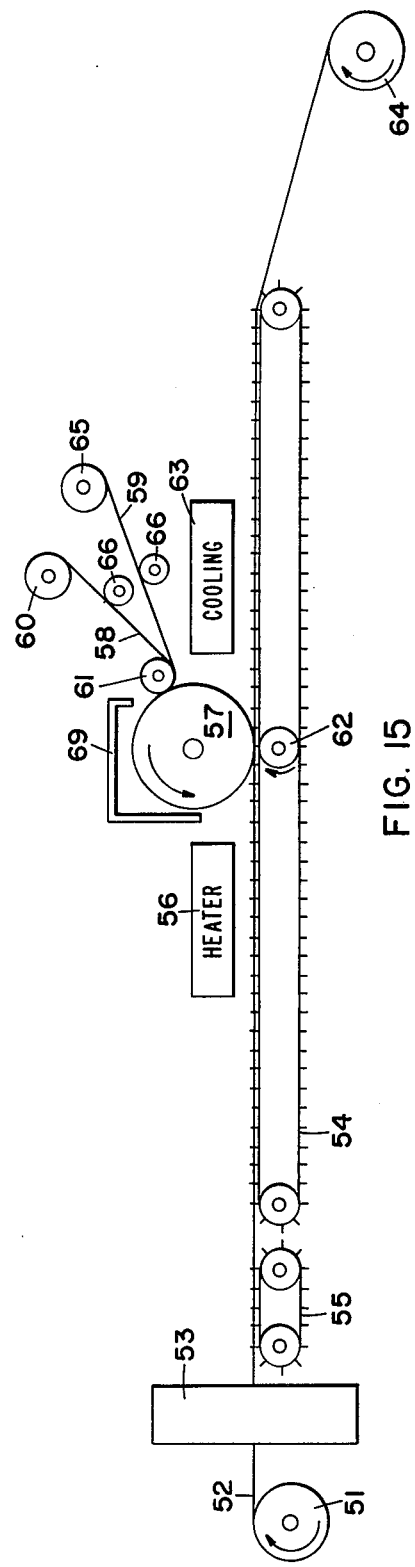
FIG. 15 is a schematic view illustrating another alternative process and apparatus for making stabilized fabrics in accordance with the principles of this invention.

Referring now to FIG. 15, there is shown a supply roll 51 that advances a fabric 52 into and through a fabric straightener 53 as previously described. The fabric 52 then advances onto a relatively short split pin tenter 55 which allows the operator to take care of any bias that may not have been corrected within the fabric straightener 53. The fabric 52 then advances onto a pin tenter 54 which maintains the fabric under transverse tension. The fabric 52 then advances past a heater 56, which heats the bottom of the fabric 52. The fabric 52 then advances beneath a heated drum 57 which is positioned between the pins of each side of the tenter 54. A supply roll 60 of thermoplastic netting 58 and a supply roll 65 of a stabilizing web 59 is provided. The netting 58 and web 59 advance over a pair of bowed rolls 66 between the nip of a heated roll 61 and heated drum 57 and continue about the rotating heated drum. A hood 69 may be positioned over the drum 57. The netting 58 is substantially completely melted as it reaches a bonding station, where the fabric 52 is urged against the netting 58 and web 59 by a roll 62 which is preferably rubber-covered and water-cooled. The temperature of the drum 57 and the dwell time of the netting 58 thereon, and the pressure at the bonding station between roll 62 and drum 57 are selected to sufficiently melt the thermoplastic netting 58 and cause substantially complete penetration of the melted thermoplastic into the fibers of the stabilizing web 59 and partial penetration of the melted thermoplastic into the fabric 52. The stabilized fabric structure is maintained under tension during bonding and continues to be maintained under transverse tension as it continues along the tenter 54 through a cooling section 63 which may have air blowers or fans or the like to cool the stabilized fabric structure to solidify the thermoplastic. It is to be noted that the fabric 52 is maintained under tension during the entire operation including heating, bonding and cooling so that little or no shrinkage can occur. After the stabilized fabric structure is cooled, it is wound on a take-up roll 64. While this apparatus and process have been described as being particularly advantageous for thermoplastic fabrics, it, of course, can also be utilized on non-thermoplastic fabrics, such as cotton, linen and rayon.

When the netting of FIG. 7 or 9 is utilized as the bonding layer, the pressure and temperature of the preheating roll, such as 43 or 61 in FIGS. 14 and 15 respectively, can be adjusted such that the netting is preheated sufficiently so that upon initial contact with the heated drum, the interconnecting bars of the netting melt and break, leaving the bosses or spots of bonding material intact. When you have sufficient preheat on the heated roller, the bars substantially instantaneously melt and break upon contact with the heated drum, thus avoiding any shrinking or deformation of netting as it is heated by the drum. This provides for uniform distribution of the bonding material over the entire fabric width.

In any of the above-described embodiments, it may be desirable to steam the fabrics prior to advancement thereof onto the pin tenter. This is particularly desirable for hygroscopic fabrics, such as fabrics made of cellulosic fibers, to facilitate removal of any wrinkles or creases by the subsequent tentering operation.

While the above-described apparatus and processes in FIGS. 13, 14 and 15 have primarily described a three-part system wherein a fabric is bonded by heat and pressure to a stabilizing web by means of a thermoplastic netting, the processes and apparatus could also be utilized in a two-part system wherein a fabric is bonded to a single composite layer which includes a thermoplastic film or netting having stable or continuous filament fibers needle-punched thereto, or a thermoplastic netting which has air-laid and bonded thereto staple or continuous filament fibers. In such a two-part system, instead of two supply rolls, such as 22 and 24, being utilized, only one supply roll would supply such a single composite layer, including both the bonding material and the stabilizing fibers, toward the heated drum to be bonded to the fabric.

Figure 16:
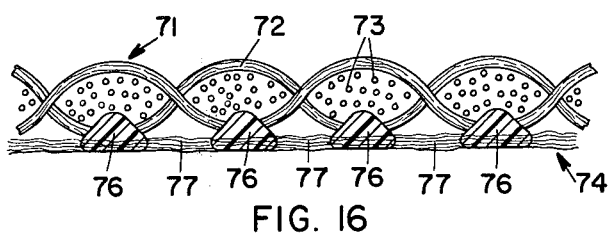
FIG. 16 is an enlarged cross-sectional view of a stabilized fabric in accordance with the principles of this invention.

Referring to FIG. 16, there is shown a stabilized fabric made in accordance with the principles of this invention. The stabilized fabric includes a woven fabric layer 71 having warp fibers 72 and fill fibers 73. A stabilizing layer of staple or continuous filament fibers is designated as 74. The fabric layer 71 is bonded to the stabilizing layer 74 by a thermoplastic bonding layer or netting such as shown in FIGS. 1–12, which, upon melting, forms spots or areas of bonding material 76 which penetrate substantially completely into the stabilizing layer 74 and partially into the fabric layer 71.

When the bonding layer of the stabilized fabric is a thermoplastic netting such as shown in FIGS. 7 and 9, the interconnecting bars of the netting break upon melting, leaving discrete spots or areas of bonding material surrounded by open spaces. The thermoplastic netting shown in FIGS. 1, 3, 5 and 11 will provide, upon melting, areas of bonding material having open spaces therebetween. With any of these bonding materials, the openings are provided to allow the fibers of the stabilizing layer to be unbonded to the fabric in some spots and to be bonded together by the melted thermoplastic layer in other spots. Thus, the stabilized fabric structure will have breathability due to the openings in the thermoplastic layer and will have a soft hand and flexibility due to the areas where the stabilizing layer of fabrics are not bonded to the fabric itself.

It is necessary that the bonding material 76 penetrate substantially completely into the stabilizing layer to provide the desired dimensional stability to the fabric and to hold the fibers of the stabilizing layer together. It is equally important that open spaces such as 77 be provided between the bonding material 76 to provide breathability of the stabilized fabric, as well as flexibility and soft hand, which is desired. The thermoplastic material 76 bonds the fibers of the stabilizing layer 74 together, as well as bonding the fibers of the stabilizing layer 74 to the fabric layer 71.

While FIG. 16 illustrates a stabilized fabric made by stabilizing a woven fabric 71, a similar structure is obtained when stabilizing knitted or tufted fabrics.

Figure 17:
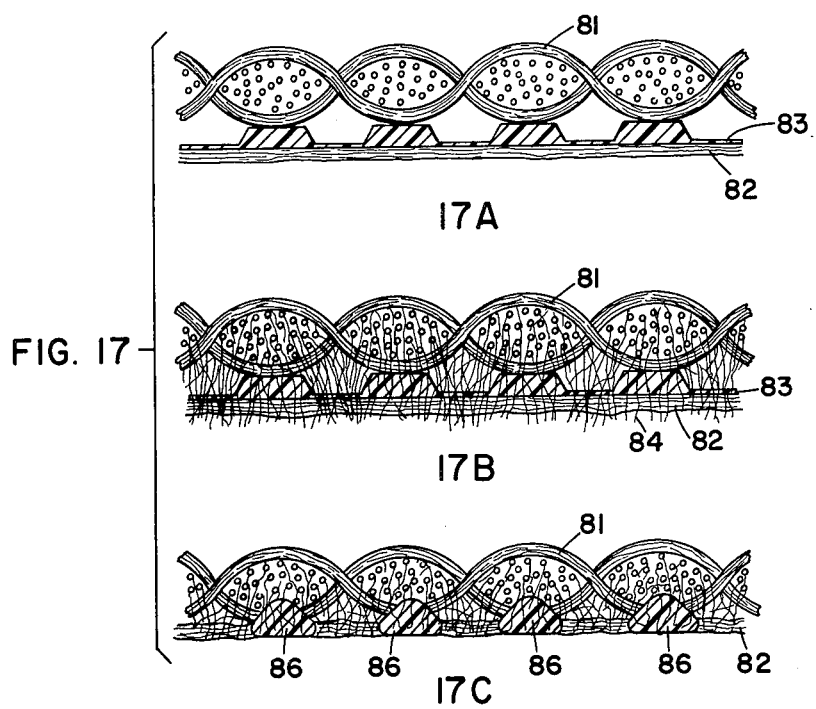
FIGS. 17A, 17B and 17C are enlarged cross-sectional views illustrating a fabric layer, bonding layer and stabilizing layer before and after needle-punching, and the stabilized fabric resulting from the subsequent bonding.

Referring to FIG. 17, there is shown in 17A a fabric layer generally designated as 81, a stabilizing layer designated as 82, and an intermediate bonding layer generally designated as 83. FIG. 17B shows the three layers 81, 82 and 83 after being needle-punched together, illustrating the fibers 84 which are transported from the fabric layer 81 by the needle-punching to interlock and entangle the bonding layer 83 and stabilizing layer 82. In FIG. 17C, the structure of 17B is shown after bonding, where the bonding layer 83 is melted to provide a plurality of bond areas 86 which penetrate substantially completely through the stabilizing layer 82 to bond the filaments thereof together and to bond the filaments of the stabilizing layer to the fabric 81.

In FIG. 18A, there is shown a fabric layer generally designated as 91, which is stabilized by needle-punching and bonding to a bonding layer 92 of netting or film. After needle-punching, the structure is shown in FIG. 18B wherein fibers 93 of the fabric 91 protrude into and through the bonding layer 92 to interlock and entangle with the bonding layer. The needle-punching transports part of the face yarn of the fabric through the netting to produce a stabilizing web of fibers on the back side of the bonding layer 92. After bonding, the structure is shown in FIG. 18C wherein the protruding fibers 93 are bonded by the melted bonding layer 92 which forms bond areas 95 which penetrate substantially completely through the protruding fibers 93 to bond the fibers together and to bond such fibers to the fabric 91 to provide the necessary dimensional stability. Between the bond areas 95 are open spaces 96 where the protruding needle-punched fibers 93 are not bonded to the fabric 91 to provide breathability and soft hand.

Figure 18:
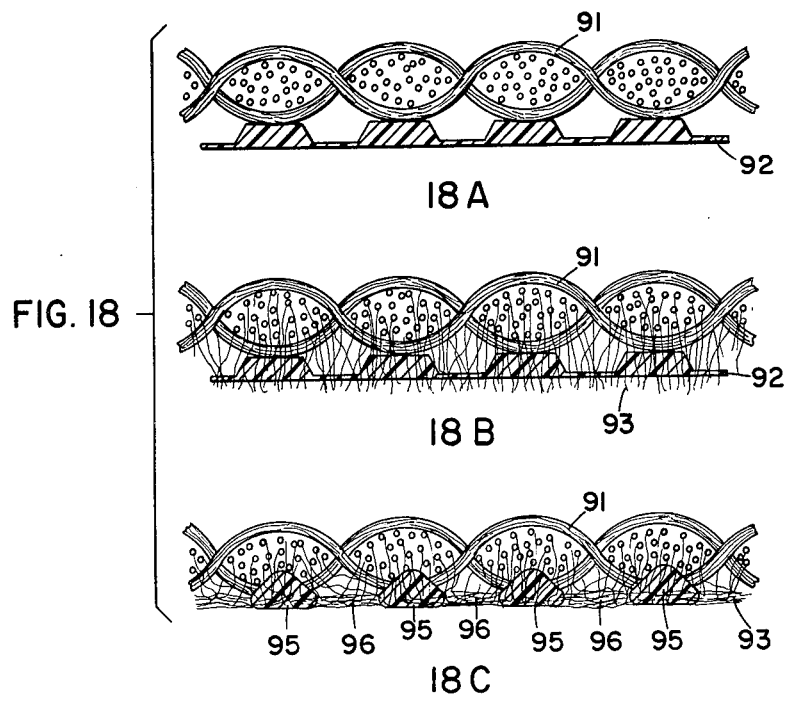
FIGS. 18A, 18B and 18C are enlarged cross-sectional views illustrating a fabric layer and bonding layer before and after needle-punching, and the stabilized fabric resulting from the subsequent bonding.

In making stabilized fabrics as described in FIGS. 17 and 18, the needle-punching operation could take place either in line prior to the tenter, or off-line in a separate operation. The needle-punched material would then be advanced onto a tenter, heated so that the thermoplastic material melts, and subjected to pressure to bond the structure as previously described. If desired, the apparatus shown in FIG. 15 could be utilized to make such a structure. The heater section 56 would have to be of sufficient length and temperature to melt the thermoplastic netting or film, and the heated structure could then either pass through a pair of cold nip rolls, or could pass between drum 57 and roll 62 as shown in FIG. 15, to bond the materials together.

In order to make flame-retardant stabilized fabrics, flame-retarding fiber such as polyvinyl chloride fiber, modacrylic fiber, NOMEX fiber (trademark of E. I. duPont de Nemours & Company), or other flame-retardant fibers, can be used in place of the staple or continuous filament fiber which is needle-punched to the thermoplastic netting in a two-part system. If a three-part system is used, the stabilizing web of staple or continuous filaments can be replaced with staple or continuous filament fibers that are flame-retardant.

Another embodiment of a flame-retardant, stabilized fabric can be made by needle-punching a thermoplastic netting, a layer of aluminum foil, and a stabilizing web together, and then subsequently bonding such a structure to a fabric as previously described. Alternatively, the netting, aluminum foil, and stabilizing web could be needle-punched directly to the fabric and then bonded together. This will provide a fabric having sufficient flame-retardancy to rate class A in the National Bureau of Standards Cigarette Ignition Test PFF 6-74.

Stabilized fabrics made in accordance with this invention exhibit the following properties: good dimensional stability, improved seam fatigue strength and seam slippage (seam fatigue strength is a dynamic test of seam strength and seam slippage is a static test of seam strength), breathability, soft hand, and high tensile strength. Additionally, better coverage is often obtained with the stabilized fabrics because the nip pressure utilized in bonding spreads out the individual yarn bundles to improve the coverage of the individual fibers in the fabric, without adversely affecting the surface texture. Additionally, the stabilized fabrics have resistance to washing since the structure is not loosened or affected by hot water washing as is latex backing. Furthermore, because of the resistance to problems with hot water washing, dyeing can be accomplished after the fabrics are stabilized without any difficulties. Dyeing operations which are carried out after latex bonding, however, are very difficult because the latex often breaks down in the dye bath. Additional advantages are that the stabilized fabric is easier to cut and sew than latex-backed fabrics. This is because the latex backing is non-uniform and is also sticky and is difficult to feed through sewing or other processing machines. Additionally, sewing needles pick up a part of the latex backing and gum up, necessitating frequent cleaning or replacement. Moreover, the stabilized structures made in accordance with this invention are significantly lighter in weight than conventional latex-backed fabrics—in the range of 20% to 50% lighter, thereby resulting in a savings in shipping and providing easier handling. Additionally the energy and water requirements of the subject process are significantly less than the conventional latex coating process, resulting in substantial savings.

The following examples will serve to illustrate this invention.

EXAMPLE 1

This example illustrates the stabilization of a Jacquard woven upholstery fabric prepared from polypropylene yarns by bonding to it a high density polyethylene netting needled with a thin web of polypropylene staple fibers.

The loosely woven fabric has an 86 warp count of 260 denier continuous filament yarn and a 16 fill count of 2,600 denier bulked continuous filament polypropylene yarn. This fabric shows an original seam slippage value of 5.6 lbs. in the machine direction and 6.8 lbs. in the transverse direction as measured by the ASTM D434-75 procedure. The fabric is aligned to make the filling yarns uniformly perpendicular to the machine direction and is placed under tension using a tenter. High density polyethylene netting weighing 0.8 oz./sq. yd. having 130 12-mil bosses per square inch which has been modified by needle-punching into it a thin web (1.0 oz./sq. yd.) of 3-denier 1.5 inch polypropylene staple fibers with 300 penetrations per inch, is laid on top of the fabric. This composite is passed around a 16-inch diameter roll heated to 143° C. The needled thermoplastic netting is adjacent to the heated roll and separated from it by a glass fabric release film. A blanket on the outside of the composite structure applied about 1 p.s.i. pressure to hold the composite against the hot roll and maintain the tension. The contact time on the roll is 30 seconds. The laminate then passes through the nip of a heated roll and an adjacent cool roll which exerts a pressure of 23 lbs. per linear inch. The laminate passes about half way around the cool roll before tension on it is released. The stabilized fabric so produced has a seam slippage value of 70 pounds in the machine direction and 44 pounds in the transverse direction and a soft, smooth back facing.

EXAMPLE 2

This example illustrates the process of stabilizing the fabric described in Example 1 using a polyvinyl chloride film needled with polyester staple fibers.

The fabric and procedure of Example 1 is employed except that the stabilizing backing is formed from a polyvinyl chloride film 2 mils thick and having 0.6 oz./sq. yrd. of 2 denier, 3 inch polyester staple fibers attached to it by needling with 300 penetrations per inch. The resulting product has a seam slippage value of 55 pounds in the machine direction and 45 pounds in the transverse direction.

EXAMPLE 3

This example illustrates the stabilization of the fabric described in Example 1 using an oriented foamed thermoplastic polyurethane netting needled with polypropylene staple fibers.

The fabric employed in Example 1 is aligned and tentered as in Example 1, and oriented, foamed thermoplastic polyurethane netting having a weight of 0.9 oz./sq. yd., which has been modified by needle-punching into it a thin web (1.0 oz./sq. yd.) of 3 denier 1.5 inch polypropylene staple fibers with 300 penetrations per inch is laid on top of it. This complete is passed 180° around a fluoropolymer coated 8 inch diameter roll heated to 146° C. and having pins on the periphery which penetrate the fabric and maintain it under tension. A 6.3 second dwell time is employed, followed by passing the laminate through the nip formed with an adjacent water-cooled 8 inch, polished, silicon rubber (Shore A hardness of 55) coated roll with a nip pressure of 45 pounds per linear inch. The fabric so treated has a seam slippage value of 65 pounds in the machine direction and 50 pounds in the transverse direction.

EXAMPLE 4

This example illustrates the stabilization of the fabric described in Example 1 using an amorphous copolyamide netting needled with cross-lapped carded cotton.

The fabric and procedure as described in Example 1 are employed, except that an amorphous copolyamide netting 0.5 oz./sq. yd. in weight, consisting of intersecting continuous filaments 3 mils thick in a grid pattern and needled with 0.8 oz./sq. yd. of cross-lapped carded cotton with 300 penetrations per inch is used as the needled thermoplastic netting and the hot roll temperature is 120° C. The seam slippage values of the resulting stabilized product are 31 pounds in the machine direction and 36 pounds in the transverse direction.

EXAMPLE 5

This example illustrates the stabilization of the fabric described in Example 1 using a high density polyethylene netting and a thin layer of random laid polypropylene staple fibers.

The fabric and procedure of Example 1 are used except that the high density polyethylene netting is modified by random laying a 0.5 oz./sq. yd. web of 3 denier 1.5 inch polypropylene staple fibers on it as the fabric and netting approach the hot roll, the staple fiber web thus being supported by the netting and coming into contact with the heated roll. The resulting stabilized fabric has seam slippage values of 37 pounds and 34 pounds in the machine and transverse directions respectively.

EXAMPLE 6

This example illustrates the stabilization of a loosely woven upholstery fabric using a high density polyethylene netting and a random laid web of rayon staple fibers.

A loosely woven upholstery fabric 10 oz./sq. yd. in weight with an 8×8 yarn count prepared from 2,600 denier bulked continuous filament polypropylene yarn and with an original seam slippage value in each direction of less than 10 pounds is stabilized using an oriented high density polyethylene net 0.8 oz./sq. yd. in weight and having 1,050 bosses/in.$^2$, 4 mils in thickness. The method of Example 3 is employed, except that a random laid web of rayon staple fibers 1.0 oz./sq. yd. in weight is laid on the high density polyethylene netting. During contact with the heated roll and subsequent pressure treatment the plastic netting melts, penetrating both the upholstery fabric and the rayon web, binding the two together, thus increasing the bulk and improving the hand and softness of the fabric as well as the dimensional stability. The seam slippage values of the resulting stabilized fabric are 37 pounds and 50 pounds in the machine and transverse directions respectively.

EXAMPLE 7

This example illustrates the stabilization of the upholstery fabric described in Example 6, using an oriented high density polyethylene net and a web of continuous filament polyester.

The upholstery fabric, plastic netting and procedure employed in Example 6 are used, except that a continuous filament polyester web weighing 0.6 oz./sq. yd. is substituted for the rayon staple web. The resulting treated fabric has considerably improved dimensional stability, increased bulk, softness and strength compared with the untreated fabric. It has a seam strength of 47 pounds and 42 pounds in the machine and transverse directions respectively.

EXAMPLE 8

This example illustrates the stabilization of the upholstery fabric described in Example 6 using an oriented high density polyethylene netting and a web of continuous filament nylon fibers.

The upholstery fabric, plastic netting and procedure employed in Example 6 are used, except that a continuous filament nylon web weighing 0.6 oz./sq. yd. is substituted for the continuous filament polyester web. The seam slippage values for the resulting stabilized fabric are 43 pounds and 48 pounds in the machine and transverse directions respectively.

EXAMPLE 9

This example illustrates the stabilization of a polypropylene upholstery fabric using oriented high density polyethylene netting and a web of staple nylon fibers.

An upholstery fabric woven from 3,600 denier bulk continuous filament polypropylene yarn, 4.9 oz./sq. yd. in weight, having a 10×6, warp by fill count per inch, is stabilized with a combination of a 0.64 oz./sq. yd. oriented, high density, polyethylene netting, and 1.0 oz./sq. yd. web of 3 denier, 2 inch staple nylon fibers. The original upholstery fabric has a seam slippage value of less than 10 pounds in each direction and a grab tensile strength of 100 p.s.i. in the machine direction and 45 p.s.i. in the transverse direction. The fabric is passed through a web straightening device to establish proper alignment of pattern, then on to a pin tenter where it is drawn to the full standard upholstery fabric width of 56 inches. From the tenter the fabric passes immediately on to a 4 foot diameter fluoropolymer coated drum which is heated to a surface temperature of 150° C. To maintain the full width of the fabric and to resist shrinkage and distortion, the fabric is retained by a line of pins around the circumference at each edge of the heated cylinder. At the point where the fabric makes contact with the heated drum the layer of thermoplastic netting (of flat, 4 mil thick hexagonal bosses, which measure 16 mils across a flat surface and are evenly distributed at a density of 900 bosses p.s.i., connected to each other by thin strips of oriented thermoplastic between each of the six sides of the hexagonal, as shown in FIGS. 9 and 10 of the drawings), and the layer of nylon web are joined to the fabric and the 3 layer laminate travels around the drum with the web against the hot surface and with the oriented netting between the fiber web and the upholstery fabric, the composite being in conact with ¾ of the circumference of the drum, at a rate of 60 ft./min. The dwell time in contact with the hot roll is 9.8 seconds. The laminate then passes through a nip formed by an 8 inch diameter water-cooled steel roll pressing against the heated drum with hydraulic pressure of 18 lbs./linear inch. The fabric then moves around the cooled roll to the wind-up. The resulting stabilized fabric has a tensile strength of 150 lbs./in. in the machine direction and 105 lbs./in. in the transverse direction and seam slippage values of 28 pounds and 35 pounds in the machine and transverse directions respectively.

EXAMPLE 10

This example illustrates stabilization of a tufted fabric as well as the use of the alternative apparatus for manufacturing stabilized fabrics shown in FIG. 14.

A tufted fabric, weighing 10.5 oz./sq. yd. and comprised of 0.11 inch pile of 1.5 denier rayon on a 48×30 count woven cotton is stabilized using a combination of spun bonded continuous filament nylon with an oriented high density polyethylene netting weight 0.8 oz./sq. yd. and having 121 bosses per square inch, about 4 mils thick (Hercules Delnet PA-218).

Using the apparatus shown in FIG. 14, the fabric is aligned as in previous examples and lifted from the tenter so as to place its back side towards the heated drum 37 at the point of contact between rolls 36 and 46 where the stabilizing material is bonded to the fabric. The stabilizing material which is a 0.6 oz./sq. yd. spun bonded nylon web 40, and the netting 35, pass over roll 43 which is heated to a surface temperature of 260° F., and, after 1 second dwell on roll 43, passes through the nip at 60 pounds per linear inch and onto the hot drum 37 which is at 385° F. After 5 seconds dwell on the hot drum 37, the netting is completely melted and is supported on the spun bonded nylon web. The melted net then contacts the fabric roll 36. The fabric and stabilizing material continue around the hot drum for 1 second and a pressure of 80 lbs./linear inch is applied by roll 46 which has a steel surface and is internally cooled by water. The stabilized structure then advances around a second water-cooled roll 47 to the take-up roll 48.

The resulting stabilized fabric was improved from a condition of nearly zero resistance to loss of tufts to a condition of complete retention of tufts after the most stringent dyeing conditions.

EXAMPLE 11

This example illustrates stabilization of a knit fabric produced from polyester spun yarn using a combination of spun bonded continuous filament nylon with an oriented high density polyethylene net. The knit fabric weighing 10.5 oz./sq. yd. had an elastic recovery of less than 75% in 5 minutes after elongation, before stabilizing. The high density polyethylene net, weighing 0.7 oz./sq. yd., has 910 bosses per square inch which are approximately 4 mils thick. The spun bonded nylon is 0.4 oz./sq. yd.

The apparatus as in FIG. 14 was used exactly as in Example 10. The stabilized fabric product has significantly improved dimensional stability, the elastic recovery being over 85% in 5 minutes after 15% elongation.

EXAMPLE 12

This example illustrates the stabilization of the upholstery fabric described in Example 9, using an oriented high density polyethylene net and a web of staple modacrylic fiber.

The upholstery fabric, plastic netting and procedure employed in Example 9 are used, except that a needle-punched staple web of modacrylic fiber weighing 1.0 oz./sq. yd. is substituted for the nylon staple web. The modacrylic web is of 3 denier, 2.5 inch fibers which were needle-punched 150 penetrations per square inch onto the plastic netting. The composite of modacrylic fibers and plastic netting was supplied to the stabilizing apparatus as one web. The resulting stabilized fabric has a tensile strength of 145 lbs./in. machine direction and 98 lbs./in. transverse direction and seam slippage values of 30 and 33 pounds in the machine and transverse directions respectively.

EXAMPLE 13

This example illustrates the stabilization and flame retardance improvement of upholstery fabric using oriented high density polyethylene netting in combination with aluminum foil and polyester staple web.

Aluminum foil, 0.35 mil thick, was plied with a 1.0 oz./sq. yd. web of polyester staple fiber, 3 denier, 1.5 inch length, and needle-punched to the extent of 25 penetrations per square inch. The foil composite so produced was then laminated to the upholstery fabric as in Example 9. The procedure as in Example 9 was followed with the exceptions (1) that the drum surface temperature was at 180° C., (2) the plastic netting was 0.8 oz./sq. yd., having 99 bosses per square inch of approximately 12 mil thickness, and (3) the aluminum foil staple web composite was used in place of the staple nylon web.

The stabilized fabric product had seam slippage of 40 and 31 pounds in the machine and transverse directions respectively, and received a rating of Class A by the Federal Standard PFF6-74, Cigarette Ignition Test.

EXAMPLE 14

This example illustrates stabilization of a fabric by an alternative procedure of needle-punching the fabric together with a thermoplastic netting and a stabilizing layer, and then applying heat and pressure to bond the loose-needled fibers of the fabric and the stabilizing layer into a dimensionally stable structure.

A woven fabric of nylon yarn, having a yarn count of 11×9, warp X fill, and a weight of 11 oz./sq. yd., is plied with a bonding layer of thermoplastic netting and a stabilizing layer of spun bonded nylon, and the combination is needle-punched together to form a composite structure. The netting and stabilizing layer are positioned at the back of the fabric and the needles penetrate into the face side of the fabric and through the back so as to entangle the netting and stabilizing layer among the fibers at the back of the fabric. A needle penetration of 250 per sq. in., at ⅝ inch depth, is used. The thermoplastic netting is high density polyethylene weighing 0.8 oz./sq. yd., having 130 12-mil bosses per square inch. The stabilizing layer is 0.4 oz./sq. yd. spun bonded nylon.

After needle-punching, the composite structure, which is formed, is supplied as a single component to the apparatus as in Example 9 and thermally bonded. The procedure and bonding conditions are the same as in Example 9, except that in this case, the fabric which enters the web straightening device has the bonding and stabilizing layers already in place. After the heating, pressing, and cooling as in Example 9, the product has seam slippage values of 30 pounds and 32 pounds in the machine and transverse directions, respectively.

In all of the preceding examples, the bonding material was observed to have penetrated substantially completely into the stabilizing layer and partially into the fabric layer.

What I claim and desire to protect by Letters Patent is:

1. A stabilized fabric comprising a fabric layer of woven, knitted or tufted fabric, dimensionally stabilizing layer of fiber, and an air-permeable bonding layer of thermoplastic material having openings therethrough defining bond areas intermediate said fabric layer and said dimensionally stabilizing layer, said thermoplastic material in said bond areas substantially completely penetrating into the fibers of said dimensionally stabilizing layer and partially penetrating the fibers of the fabric layer to interconnect the fibers of the dimensionally stabilizing layer to each other and to the fibers of the fabric layer.

2. A stabilized fabric as set forth in claim 1 wherein said bonding layer is a thermoplastic netting and wherein said dimensionally stabilizing layer is a web of spun bonded or staple fiber.

3. A stabilized fabric as set forth in claim 1 wherein said dimensionally stabilizing layer and bonding layer comprise a unitary composite structure of a thermoplastic netting or film having a web of staple or continuous filament fibers needle-punched thereto.

4. A stabilized fabric as set forth in claim 1 wherein said dimensionally stabilizing layer and bonding layer comprise a unitary composite structure of a thermoplastic netting having a web of staple or continuous filament fibers bonded thereto.

5. A stabilized fabric as set forth in claim 1 wherein said air-permeable bonding layer is a plurality of discrete spots of bonding material in a substantially uniform pattern.

6. A stabilized fabric as set forth in claim 1 wherein the staple or continuous filament fibers of said dimensionally stabilizing layer are flame retardant.

7. A stabilized fabric as set forth in claim 3 wherein said unitary composite structure includes a layer of aluminum foil interposed between and needle-punched to said thermoplastic netting or film and said web of staple or continuous filament fibers.

8. A stabilized fabric as set forth in claim 1 wherein said bonding layer and said dimensionally stabilizing layer are needle-punched to said fabric layer prior to bonding.

9. A stabilized fabric as set forth in claim 8 including a layer of aluminum foil interposed between said bonding layer and said dimensionally stabilizing layer.

10. A stabilizing fabric as set forth in claim 1 wherein said dimensionally stabilizing layer and said bonding layer have interposed therebetween a layer of aluminum foil, and said three layers are needle-punched together to form a unitary composite structure prior to bonding to said fabric layer.

11. A stabilized fabric as set forth in claim 1 wherein said dimensionally stabilizing layer includes staple or continuous filament fiber.

* * * * *

UNITED STATES PATENT AND TRADEMARK OFFICE
CERTIFICATE OF CORRECTION

PATENT NO. : 4,159,360
DATED : June 26, 1979
INVENTOR(S) : Charles W. Kim

It is certified that error appears in the above-identified patent and that said Letters Patent are hereby corrected as shown below:

Col. 1, line 65 " or either " should read -- to either --.

Col. 4, line 45 " fabrics " should read -- fibers --.

Col. 5, line 12 " beneath " should read -- between --.

Col. 10, line 39 " complete " should read -- composite --.

Signed and Sealed this

Eleventh Day of September 1979

[SEAL]

Attest:

LUTRELLE F. PARKER

*Attesting Officer*   *Acting Commissioner of Patents and Trademarks*